UNITED STATES PATENT OFFICE 2,444,012

METHOD OF PREPARING 2-SULFANIL-AMIDOPYRAZINE

Elmore H. Northey, Bound Brook, and John S. Webb, Plainfield, N. J., assignors to American Cyanamid Company, New York, N. Y., a corporation of Maine No Drawing. Application May 16, 1944, Serial No. 535,878

7 Claims. (Cl. 260—239.6)

This invention relates to a new method of preparing 2-sulfanilamido-pyrazine.

The compound, 2-sulfanilamidopyrazine, also known as sulfapyrazine, has shown superior properties as a chemotherapeutic agent in many clinical studies. The introduction of the material into general medical use has, however, been unduly delayed by difficulties of commercial production at a cost which will permit it to compete with other sulfonamide drugs of comparable potency and low toxicity.

Presently-known methods of preparing 2-sulfanilamidopyrazine involve the reaction of such compounds as acetylsulfanilyl chloride, paranitrobenzenesulfonyl chloride, and the like, with aminopyrazine. These reactions require the use of solvents, such as pyridine, which must be separated from the product. To obtain the active material, 2-sulfanilamidopyrazine, it is necessary to treat the reaction product further in order to convert the para-benzene substituent to an amino group. The yields obtained by these processes are not particularly good. The preparation of 2-amino-pyrazine as an intermediate is also difficult, and therefore expensive.

We have now discovered that 2-sulfanilamidopyrazine may be prepared by the direct action of sulfanilamide with a halopyrazine. This reaction may be illustrated by the following equation, in which chloropyrazine and potassium carbonate are employed.

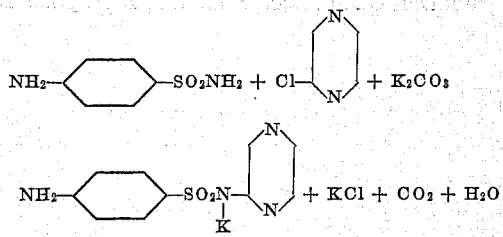

As will be seen from the above equation, we obtain the potassium salt of 2-sulfanilamidopyrazine directly as a reaction product. The use of obnoxious solvents and catalysts is unnecessary, and in fact, a decided improvement in the process is made by their elimination. It will be apparent, therefore, that the principal advantages of the present invention lie in the fact that the desired product is obtained directly by a cheap and simple one-step process with excellent yields, which makes the commercial production of 2-sulfanilamidopyrazine practical. Other objects and advantages of our process will appear hereinafter.

Although our process is subject to certain modifications and variations, one effective procedure of preparing 2-sulfanilamidopyrazine is as follows: 114 parts by weight of chloropyrazine, 344 parts by weight of sulfanilamide, and 210 parts by weight of potassium carbonate are placed in a suitable reaction vessel equipped with means of heating to an internal temperature of about 165° C., a powerful agitator, and a reflux condenser. The reaction mixture is heated until a small stream of liquid is condensing in the reflux condenser. The internal temperature at this point is about 130° C. Maintenance of an atmosphere of nitrogen, or other inert gas, over the reaction mixture helps to prevent oxidation of sulfanilamide to colored products. Heating is continued for about 5 hours, during which time the temperature of the charge rises gradually to 145–150° C., and the reaction mixture thickens to a heavy paste. The charge is then cooled to about 100° C., and about 500 parts of water is added. Unreacted chloropyrazine is recovered by steam distillation.

The charge is adjusted with an acid to a pH between 8.0 and 9.5 and is then cooled to about 10° C. to crystallize the excess sulfanilamide present. The very soluble potassium salt of 2-sulfanilamidopyrazine is in the filtrate. After warming to about 75° C., crude 2-sulfanilamidopyrazine is precipitated from solution by the addition of mineral acid to the filtrate until it has a pH of approximately 5. The crude sulfapyrazine, which has a slightly tan color, is then recovered by filtration.

Further purification of the sulfapyrazine may be carried out by dissolving the crude drug in an alkaline solution, treating the solution with activated charcoal, filtering, and then re-precipitating the sulfapyrazine by acidifying. Other methods of purification commonly used with other crude sulfonamide drugs may also be employed.

The yield of 2-sulfanilamidopyrazine by the foregoing process is in excess of 80 per cent based on the net usage of chloropyrazine.

While the above-described method is a preferred one, it should be understood that our process is not limited to this particular procedure. For example, solvents for the reactants may be used. However, in the event that the boiling point of the solvent is below about 130° C., for example, when water is used, it is necessary to use a pressure vessel to attain reaction temperatures. Of course, pressure vessels may also be used to avoid the use of a reflux condenser if desired.

In place of chloropyrazine we may use other halopyrazines such as bromopyrazine or iodopyrazine. However, because of the relative cheapness of chloropyrazine we prefer this compound.

Other acid-binding agents, such as sodium carbonate, barium carbonate, sodium bicarbonate, sodium and potassium hydroxide, and the like, may be used in place of potassium carbonate if desired. In general, any substance which will react with a halogen acid at the temperature of the reaction may be used as an acid-binding agent.

Although we prefer to carry out our process within the temperature range of from about 130° C. to 165° C., temperatures outside these limits may be employed, particularly during part of the reaction. In general, the temperature should be maintained between 125° C. and 175° C.

We claim:

1. A method of preparing 2-sulfanilamidopyrazine which comprises the steps of forming a mixture consisting of sulfanilamide, a halopyrazine, and a member of the group consisting of alkali metal carbonates and alkali metal bicarbonates as the reactants and heating the mixture until 2-sulfanilamidopyrazine has been formed and thereafter recovering the said product.

2. A method of preparing 2-sulfanilamidopyrazine which comprises the steps of forming a mixture consisting of sulfanilamide, a halopyrazine, and potassium carbonate as the reactants and heating the mixture at temperatures within the range of 125° C. to 175° C. until 2-sulfanilamidopyrazine has been formed and thereafter recovering the said product.

3. A method of preparing 2-sulfanilamidopyrazine which comprises the steps of forming a mixture consisting of sulfanilamide, chloropyrazine, and a member of the group consisting of alkali metal carbonates and alkali metal bicarbonates as the reactants and heating the mixture at temperatures within the range of 130° C. to 165° C. until 2-sulfanilamidopyrazine has been formed and thereafter recovering the said product.

4. A method of preparing 2-sulfanilamidopyrazine which comprises the steps of forming a mixture consisting of sulfanilamide, bromopyrazine, and a member of the group consisting of alkali metal carbonates and alkali metal bicarbonates as the reactants and heating the mixture at temperatures within the range of 130° C. to 165° C. until 2-sulfanilamidopyrazine has been formed and thereafter recovering the said product.

5. A method of preparing 2-sulfanilamidopyrazine which comprises the steps of forming a mixture consisting of sulfanilamide, iodopyrazine, and a member of the group consisting of alkali metal carbonates and alkali metal bicarbonates as the reactants and heating the mixture at temperatures within the range of 130° C. to 165° C. until 2-sulfanilamidopyrazine has been formed and thereafter recovering the said product.

6. A method of preparing 2-sulfanilamidopyrazine which comprises the steps of forming a mixture consisting of sulfanilamide, chloropyrazine, and an alkali metal carbonate as the reactants and heating the mixture at temperatures within the range of 125° C. to 175° C. until 2-sulfanilamidopyrazine has been formed, removing the reactant chloropyrazine by steam distillation, precipitating the unreacted sulfanilamide by adjusting the reaction mixture to a pH between the range 8.5 to 9.0 and cooling, and then precipitating 2-sulfanilamidopyrazine by acidifying the solution and thereafter recovering the said 2-sulfanilamidopyrazine.

7. A method of preparing 2-sulfanilamidopyrazine which comprises the steps of forming in a solvent a mixture consisting of sulfanilamide, a halopyrazine, and a member of the group consisting of alkali metal carbonates and alkali metal bicarbonates as the reactants and heating the mixture at temperatures within the range of 125° C. to 175° C. until 2-sulfanilamidopyrazine has been formed and thereafter recovering the said product.

ELMORE H. NORTHEY.
JOHN S. WEBB.

REFERENCES CITED

The following references are of record in the file of this patent:

UNITED STATES PATENTS

| Number | Name | Date |
|---|---|---|
| 2,259,222 | Ewins | Oct. 14, 1941 |
| 2,293,811 | Ewins | Aug. 25, 1942 |
| 2,362,087 | Newberry | Nov. 7, 1944 |
| 2,403,776 | Winnek | July 9, 1946 |

OTHER REFERENCES

Journal Amer. Chem. Soc., Sept. 1941, pp. 2524–2525; ibid., Oct. 1941, pp. 2739–2740; ibid., Nov. 1941, pp. 3153–3154.

Journal Chem. Soc. (London), 1941, pp. 9–15.